INVENTORS
JOSEPH B. LEIBEE
LAVERN J. AHLES

BY David Katz

ATTORNEY 3,190,339
PNEUMATIC TIRE
Joseph Leibee, Westminster, and Lavern J. Ahles, Meadowood, Del., assignors to E. I. du Pont de Nemours and Company, Wilmington, Del., a corporation of Delaware
Filed Jan. 24, 1963, Ser. No. 253,562
5 Claims. (Cl. 152—374)

This invention relates generally to pneumatic tires and, more particularly, to a nylon-reinforced tire with substantially reduced "flat-spotting" tendencies.

Nylon tire cords owe their widespread acceptance to the superior service they give under heavy loads, at high speeds, and to their bruise and impact resistance. However, tires reinforced with conventional nylon cords, e.g., polyhexamethylene adipamide, usually exhibit a temporary phenomenon known as "flat-spotting," i.e., a flatness develops on the tire surface in contact with the road as the tire stands still and cools after use. When the tire is again placed in use, this flatness persists temporarily and a thumping sound is audible. This phenomenon has been attributed, at least in part, to such visco-elastic properties as the relatively low dimensional stability, low modulus, and high growth of conventional polyamide yarns. The present invention is based on the discovery that flat spotting of a tire having nylon cords in the carcass is accentuated if not actually caused by the presence of moisture in said nylon layers of the carcass.

Although the moisture may be controlled during tire manufacturing and storage to make available a nylon tire with a tolerable tendency to flat spotting, once the tire is put to use, it accumulates moisture, which enters by seeping through the elastomer in the sidewall and also near the bead region. The textile of the chafer strip, being close to the exposed surface of the tire, acts as a wick to quickly transport moisture from the bead region to the tire cords. The chafer strip is a narrow strip of fabric embedded in an elastomer matrix which covers the ends of the carcass plies that are turned around the bead wire to secure those plies.

Moisture also appears to be absorbed by the tire cords when the tire is kept in storage for long times, particularly in a humid atmosphere.

This invention has as its most important objective the provision of a nylon-reinforced tire which retains an acceptable "depth of flat spot" even after prolonged storage or after service in moist environments.

A further objective of this invention is the provision of a tire reinforced with nylon cords which resists the seeping of moisture through the bead region and through the sidewalls.

Other objectives will appear hereinafter.

These and other objectives in a pneumatic tire which is reinforced with polyamide cords are accomplished according to this invention by constructing such a tire with a sheet-like shielding layer of moisture-impervious rubber stock covering the outer face of each sidewall region of the carcass, including the bead regions, and extending circumferentially for the full tire circle, whereby to insulate the cords of said carcass against absorbing moisture from the surroundings. In certain embodiments of this invention, conventional chafer strips are employed, and the water-impervious shield may extend in a continuous layer from each sidewall region downwards and around the bead portion of the tire, on the inside of the adjacent chafer strip. In other modifications, the chafer strips themselves may be made of a water-impervious rubber matrix, for instance chlorobutyl rubber stock, in which is embedded a fabric woven of textile monofils or, less preferably, of cord structure containing fillers to decrease wickability. In such cases, the side shielding need not extend downwards much beyond a certain overlapping contact with said water-impervious chafer strip.

The tire is preferably also made to contain an innerliner (covering the entire inner surface of the tire carcass) made of moisture-impervious elastomer, whereby to make the moisture insulation of the carcass cord plies essentially complete.

There might be obtained manipulative advantages in building the tire, by constructing the side shielding as one continuous sheet extending over the top of the carcass and therefore, having a portion of the sheet located between the tread elastomer stock and carcass. However, the thickness of the tread obviates the need for a water-impervious structure under the tread. Furthermore, such a structure of soft rubber stock under the tread tends to weaken the bond of the tread to the carcass and may also be deleterious to tread wear. Therefore, the recommended practice is to build said sidewall shielding of two separate ribbons, the upper edges of which are separated by a space not narrower than the width and not wider than 1.1 times the width of the tread intended to be applied to the tire.

In the preferred embodiments of this invention, said moisture-impervious shielding (and moisture-impervious chafer strips, where used) are made of elastomer stock consisting predominantly of halogenated butyl rubber.

For the purpose of this invention, "consisting predominantly of halogenated butyl rubber" implies consisting of a rubber stock composition in which halogenated butyl rubber constitutes not less than 50% by weight of all the elastomeric components. By halogenated butyl rubber is meant a halogenated isobutylene-isoprene copolymer.

A typical rubber stock of halogenated butyl rubber useful for this invention is, for instance, the following:

TABLE I

*Chlorobutyl rubber stock*

| Ingredient: | Parts by weight |
|---|---|
| Chlorobutyl rubber (containing 1 to 2 mole percent unsaturation and 1.1 to 1.3% by weight Cl) | 90 |
| Natural rubber | 10 |
| Carbon black | 65 |
| Rubber-plasticizing petroleum oil | 12 |
| Hydrogenated rosin | 6 |
| Zinc oxide | 5 |
| Sulfur | 1 |
| Vulcanization accelerator (mostly diphenyl guanidine) | 1.25 |
| Stearic acid | 2 |

Halogenated butyl rubbers do not have the good abrasion resistance of synthetic styrene-butadiene rubber stock (SBR) which is conventionally used for tread and sidewalls. Therefore, to accomplish the objectives of this invention as well as to have an otherwise outstanding pneumatic tire, the overlying elastomer shell should be made of abrasion resistant stock, such as SBR or cis-polybutadiene rubber, limiting the use of halogenated butyl rubber to said chafer strips, outer sidewall impervious shields and innerliner.

For further clearness in the understanding of this invention, reference is now made to the accompanying drawing, in which—

Figure 1:
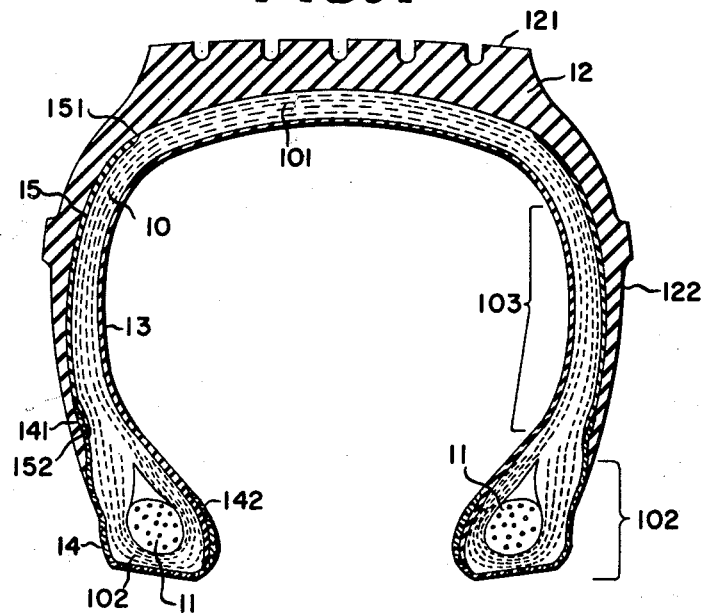
FIG. 1 is a vertical section of a tire showing one embodiment of this invention in which the chafer strips are made of moisture-impervious material containing reinforcement fabric, while the sidewall shields are made just of moisture-impervious material.

In these figures, 10 is the carcass in general and is made in conventional manner of a plurality of elastomer-embedded nylon-cord plies 101. The elastomer material in these plies may be ordinary rubber, SBR stock, or any other convenient material. The plies of the carcass run continuously around the U-shaped cross section of the tire, and are turned at the ends around steel wire beads 11, forming the bead regions 102 of the carcass.

The overlying elastomer shell 12 comprises the tread 121 and sidewalls 122, and in this invention is made of abrasive resistant material, such as SBR stock.

An innerliner 13 of water-impervious elastomer material, for instance chlorobutyl rubber, covers the entire inside of the carcass cross section.

A chafer strip 14 surrounds each bead region 102, and in FIG. 1 it is made up of monofil nylon fabric embedded in chlorobutyl rubber stock. A sheet-like shield 15 made of chlorobutyl rubber stock covers each sidewall region 103 of the carcass, lying between the latter and sidewall 122 of the elastomer shell. In FIG. 1, this shield reaches from a point 151 just about underneath the edge of tread 121, downwards to a point 152, where it is overlapped to some extent by the edge 141 of the chafer strip. The other edge 142 of the chafer strip runs upwards for a considerable distance inside the U of the tire and overlaps the lower portion of the innerliner 13.

Figure 2:
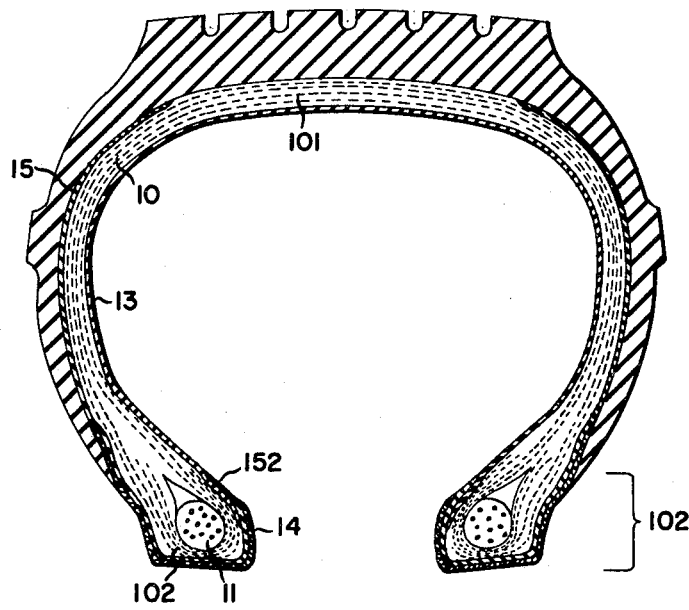
FIG. 2 is a similar view of another embodiment, in which conventional chafer strips are employed and the sidewall-impervious shielding on each side is wide enough downwards to wrap around the bead region inside the adjacent chafer strip.

In FIG. 2, shield 15 runs down the wall of the carcass and envelops the bead region of the carcass until it terminates at edge 152 in overlapping relation to the innerliner. The chafer strip 14, which may in this modification be made of conventional material (for instance, rayon fabric embedded in SBR stock), preferably lies outside said shield-enveloped bead region.

The mode of manufacturing a tire according to this invention is illustrated by the following examples:

EXAMPLE I

Taking a four-ply, bias carcass, nylon tire of size 8.50–14 as an illustration, a 58-mil thick innerliner of chlorobutyl rubber stock (of the composition specified in Table I) is first placed on a conventional tire building drum, and the carcass is then built in conventional manner on top of said innerliner. The ply ends are turned around steel wire beads, and then a ribbon of chlorobutyl rubber stock (as in Table I), 7½ inches wide and 50 mils thick is placed on each side of the center line of the flat mass on the drum, leaving between them a space 5¼ inches wide. A chafer strip 2⅛ inches wide and comprising fabric woven of nylon monofilaments of 9-mils diameter, embedded in a matrix of chlorobutyl rubber stock, is then wrapped around each covered bead. When thus placed, each shield will extend under the edge of the adjacent chafer strip for about ½ inch. Next, the elastomer piece which comprises the tread (5″ wide) and the sidewalls of the tire is laid down on top of and centered on the carcass plies. Finally, the tire is placed in a conventional shaping and curing press, and vulcanized.

EXAMPLE II

The procedure is as in Example I, except that two sheets of chlorobutyl stock (formulated as in Table I) 9½ inches wide and 50 mils thick (and containing no cord reinforcements) are placed symmetrically about the center line of the flat carcass mass on the drum, with their inner edges separated by a space 5¼ inches wide. The outer edges of these sheets are then turned under and around the bead regions until they reach and partly overlap the innerliner, whereby to enclose each bead region in a moisture impervious film. Then a conventional chafer strip (2⅛ inches wide) of high tenacity rayon square woven fabric embedded in a matrix of SBR stock is placed around each shield-wrapped bead.

In actual tests made with tires built according to this invention (i.e. with chlorobutyl moisture protection on the inside, around the bead regions and on the outer sidewall regions of the carcass), it was found that their initial flat spotting tendency does not increase much in storage compared to that of a tire built from standard SBR rubber stock without any chlorobutyl shielding anywhere. From numerical measurements (according to standard procedure, in mils), it is estimated that whereas the standard SBR tire will increase its flat spot value about 150% when stored for 100 days at 80° F. in an atmosphere of 80 to 100 R.H. (relative humidity), a tire built according to Example II above will under the same conditions suffer an increase of less than 25%.

It will be understood that the expressions "flat spot" or "flat spot depth" of a tire refers to a tendency to produce a flat spot under certain conditions and not to an existing flat spot. (The conditions are: Being loaded while hot and then standing under the same load until the tire cools off.) This tendency is generally measured in mils by the following procedure:

The tire to be tested is mounted on the rim of a wheel (corresponding to the size of the tire), freely supported on a short axle. The tire is inflated to the pressure normally recommended for that tire, whereupon the wheel is suspended in an oven so that the tire does not rest against either ground or ceiling, and the tire is heated to 170° F. The unloaded out-of-roundness of the tire is then measured, by an appropriate instrument, in mils.

The wheel is then loaded to a standard weight (as prescribed by the standards of the Tire and Rim Association) and then allowed to stand under the load on a flat surface, outside the oven, for two hours, which procedures will generally develop a flat spot. The load is then removed, and the out-of-roundness of the cooled tire is measured, in mils, and corrected for the over-all shrinkage of the tire. The difference between the values obtained in the two mentioned measurements constitutes the flat spot depth.

In actual practice, riding characteristics are acceptable when a tire has a flat spot depth of less than 160 mils. However, with the superior suspension systems of present-day automobiles riding on today's better designed highways, the tendency is to limit permissible flat spot depth to about 120 mils. Where proper control of moisture is applied during tire manufacture, tires with an initial flat spotting value as low as about 80 mils may reasonably be expected. Since storage up to 100 days of a tire made according to this invention does not increase this value by more than 25%, a tire thus constructed would be practically assured not to exceed in flat spotting value the currently tolerable maximum, no matter what may be the humidity condition of either storage or service.

Although the preferred moisture impermeable stock for the shield, etc. of this invention is chlorobutyl rubber, brominated butyl rubber, and to a less desirable degree also reclaimed butyl rubber are also advantageous.

Non-halogenated, virgin (i.e. non-reclaimed) butyl rubber also acts as a barrier to moisture flow, but because it does not vulcanize readily with other rubbers, it is not recommended for this invention.

The present invention is also applicable for the improvement against flat-spotting of tires whose carcass plies contain cords from polyamides other than polyhexamethylene adipamide (66 nylon). Such other polyamides may be, for instance, polycaproamide, polyundecanoamide, polyhexamethylene sebacamide, polymetaxylylene adipamide, polyhexamethylene-t-butyl isophthalamide, polymetaxylylene sebacamide, and copolyamides and blends thereof. Of particular interest in this connection is the polyamide melt-blend formed from a melt of 80 parts polyhexamethylene adipamide and 20 parts polyhexamethylene isophthalamide. (This particular polyamide melt-blend is itself novel and is more fully described and claimed in copending application of Joseph Zimmerman, Ser. No. 199,375, filed June 1, 1962.)

It is apparent that other variations and modifications in the tire and in the procedures followed in its fabrication may be adapted without departing from the spirit of the present invention, which is therefore intended to be limited only by the scope of the appended claims.

We are aware that the use of innerliners in tires, especially for tubeless tires, is old, and also that such innerlines have sometimes been made of halogenated butyl rubber. However, the need for water-impervious shielding of the carcass, particularly one having polyamide cord reinforcements, has apparently not been recognized heretofore, and certainly, to our knowledge, no one has hitherto attempted to make the exclusion of moisture complete by providing moisture-impervious shielding in or around the chafer strip and along the outer sidewalls.

We claim as our invention:

1. A pneumatic tire characterized by a structure comprising
   (a) a carcass of essentially U-shaped cross section and comprising a plurality of plies of elastomer-embedded nylon cords, said carcass comprising (a') sidewall regions and (a'') bead regions near the open ends of said U-shaped cross section,
   (b) an elastomeric shell, including a tread portion, in overlying and surrounding contact with said carcass, said elastomeric shell being made up of predominantly styrene-butadiene rubber stock,
   (c) chafer strips surrounding the bead regions of said carcass whereby to prevent direct contact between the ends of said U-shaped cross section and the metallic rim of an automotive vehicle wheel upon which said tire is to be mounted, and
   (d) a sheet-like layer of halogenated butyl rubber stock covering the outer face of each sidewall region of the carcass and each bead region of said carcass, and extending circumferentially for the full tire circle, whereby to insulate the cords of said carcass against absorbing moisture from the environment.

2. A pneumatic tire characterized by a structure comprising
   (a) a carcass of essentially U-shaped cross section and comprising a plurality of plies of elastomer-embedded nylon cords, said carcass comprising (a') sidewall regions and (a'') bead regions near the open ends of said U-shaped cross section,
   (b) an elastomeric shell, including a tread portion, in overlying and surrounding contact with said carcass, said elastomeric shell being made up of predominantly styrene-butadiene rubber stock,
   (c) chafer strips surrounding the bead regions of said carcass whereby to prevent direct contact between the ends of said U-shaped cross section and the metallic rim of an automotive vehicle wheel upon which said tire is to be mounted, and
   (d) a sheet-like layer of halogenated butyl rubber stock covering each of the sidewall regions of the carcass, each layer extending circumferentially for the full tire circle and extending widthwise from an upper line essentially touching the outer boundary of the tread width of the tire, downwards and inwards sufficiently to envelop the respective bead region, whereby to insulate the cords of said carcass against absorbing moisture from the environment.

3. A pneumatic tire as in claim 2, said tire comprising further an innerliner of halogenated butyl rubber stock covering the inside of said U-shaped tire in overlapping relation with said sheet-like layer sheet enveloping the bead region.

4. A pneumatic tire as in claim 2, said chafer strips (c) being made of rayon woven fabric embedded in a matrix of styrene-butadiene rubber stock, said chafer strips being disposed on the outside of said layers (d) of halogenated butyl rubber stock.

5. A pneumatic tire as in claim 2, said chafer strips (c) being made of nylon monofilaments embedded in a matrix of chlorbutyl rubber stock, said chafer strips being disposed on the outside of said layers (d) of halogenated butyl rubber stock.

References Cited by the Examiner
UNITED STATES PATENTS

| 2,788,839 | 4/57 | Kindle et al. | 152—330 X |
| 2,822,019 | 2/58 | Koch et al. | 152—362 |
| 2,992,962 | 7/61 | Borland et al. | 152—330 |
| 2,996,095 | 8/61 | Rowe et al. | 152—330 |
| 3,038,518 | 6/62 | Hershey | 152—362 |

ARTHUR L. LA POINT, *Primary Examiner.*